United States Patent [19]

Isozumi et al.

[11] Patent Number: 5,019,739

[45] Date of Patent: May 28, 1991

[54] DC MOTOR FOR AUTOMOTIVE ENGINE STARTER

[75] Inventors: Shuzoo Isozumi; Tetsuo Yagi; Toshinori Tanaka, all of Himeji, Japan

[73] Assignee: Mitsubishi Denki Kabushiki Kaisha, Tokyo, Japan

[21] Appl. No.: 403,520

[22] Filed: Sep. 6, 1989

Related U.S. Application Data

[62] Division of Ser. No. 249,174, Aug. 15, 1988, Pat. No. 4,978,874.

[51] Int. Cl.[5] .......... H02K 13/04

[52] U.S. Cl. .......... 310/233; 310/83

[58] Field of Search .......... 310/42, 83, 233, 237, 310/261, 271

[56] References Cited

U.S. PATENT DOCUMENTS

| | | | |
|---|---|---|---|
| 550,407 | 11/1895 | Dice | 310/233 |
| 4,116,077 | 11/1976 | Mazzorana . | |
| 4,587,861 | 7/1984 | Morishita . | |
| 4,604,907 | 11/1984 | Morishita et al. . | |
| 4,852,417 | 8/1989 | Tanaka | 310/83 |
| 4,862,027 | 8/1989 | Isozumi et al. | 310/83 |
| 4,912,352 | 3/1990 | Isozumi et al. | 310/237 |
| 4,933,587 | 6/1990 | Tanaka et al. | 310/233 |

FOREIGN PATENT DOCUMENTS

| | | | |
|---|---|---|---|
| 658860 | 3/1963 | Canada | 310/233 |
| 1311876 | 9/1961 | France . | |
| 88/04490 | 6/1988 | PCT Int'l Appl. | 310/237 |
| 2082848 | 3/1982 | United Kingdom | 310/233 |

*Primary Examiner*—Steven L. Stephen
*Assistant Examiner*—D. L. Rebsch
*Attorney, Agent, or Firm*—Lowe, Price, LeBlanc, Becker & Shur

[57] ABSTRACT

An engine starter includes a motor having a tubular armature rotation shaft, and a rotation output shaft arranged on one axial end side of the motor coaxially therewith to be axially slidably supported. A clutch mechanism is included for transmitting torque from the armature rotation shaft to a rotation output shaft and an electromagnetic switch which has a shifting member to push the aforementioned rotation output shaft by an electromagnetic force in the axial direction to slidably move it. The switch also brings movable contacts in touch with fixed contacts to supply power to the aforementioned motor. A rear part of the rotation output shaft and the front part of the shifting member are inserted into the armature rotation shaft tube from opposite directions. The shifting member of the electromagnetic switch, the armature rotation shaft and the rotation output shaft are all coaxially arranged to reduce the length of the starter. The coaxial arrangement is highly effective in preventing invasion of dust into the contact chamber of the electromagnetic switch. To ensure a compact size for the starter a compact spring is provided for restoring the rotation shaft to a rest position after the engine has started.

5 Claims, 8 Drawing Sheets

DC MOTOR FOR AUTOMOTIVE ENGINE STARTER

This application is a division of application Ser. No. 07/249,174 filed Aug. 15, 1988, now U.S. Pat. No. 4,978,674.

TECHNICAL FIELD OF THE INVENTION

The present invention relates to improvements in engine starters used in automobile engines and de motors used in such engine starters and the like.

BACKGROUND OF THE PRIOR ART

Heretofore, starters of this type had planetary reduction gears built therein, as shown in FIG. 1. In this figure, 101 designates an armature, and 102 is an armature rotation shaft with a commutator 103 engagingly set thereon at the rear part thereof. To this commutator 103, armature coils 104 are connected.

Brush and holder 105 are disposed to be in contact with the commutator 103, and are secured to a rear bracket 107. 108 is a bearing, and 109 is a yoke of a dc motor which has a plurality of permanent magnets 102*a* securely set on an internal circumferential surface thereof.

On an end surface of this yoke 109 is a front bracket 111 wherein an internal gear 110, which comprises a planetary reduction gear, is engagingly fit and mounted as shown in the figure. Spur gear 112 and internal gear 110 engage with a plurality of planetary gears 113. Bearing 114 is supported by a supporting pin 115 and is engagingly set to the internal circumferential surface of the planetary gear 113. Flange 116 fixedly supports supporting pin 115 which acts as an arm supporting a planetary reduction gear, with a rotation output shaft 117 fixedly set thereon at the rear. Sleeve bearings 118 and 119 engagingly fit in the rear inner circumferential cavity of the rotation output shaft 117, which bears the front end part of the aforementioned armature rotation shaft 102.

Steel ball 120 is provided for giving and taking the thrust force, and helical spline 121 is formed on the outer circumference of the intermediate part of the rotation output shaft 117, with an overrunning clutch 122 in front and rear slidably splined thereon. A stopper 123 is provided at the front end part of the output shaft 117 for controlling the axial shift of a pinion 124, and a sleeve bearing 125 is provided for bearing the rotation output shaft 117 at its front end part, which is engagingly set on the front end inside surface of the front bracket 111. Lever 126 has a rotation shaft 126*a*, each end of which is to be engagingly fit on the outer peripheral parts of a plunger 128 of an electromagnetic switch 127 and the overrunning clutch 122, as shown in FIG. 1.

A movable contact 129 is mounted on a rod 131 through an insulator 130, and the rod 131 is movably inserted in a core 132. Fixed contact 133 is fixed by means of a nut 134 to insulate cap 135. Exciting coil 136 urges the plunger 128, which is wound on a bobbin 137 and is contained in a case 138 in that state. A lead wire 139 connects the fixed contact 133 with a brush of the brush-and-holder 105.

The operation of this prior art starter is described below.

By closing a key switch (not shown), an exciting coil 136 of the electromagnetic switch 127 is electrified, whereby the plunger 128 is urged to move backward to push the rod 131 backward, thereby making the movable contact 129 abut on the fixed contact 133. Power is then supplied to the armature coils 104 from the fixed contacts 133 through lead wires 139 and the brush-and-holder 105, causing the armature 101 to produce a turning force. The rotation of the armature 101 is transmitted from the spur gear 112 to the planetary gear 113 and then to the overrunning clutch 122, with the speed reduced by the planetary reduction gear. At this time, the pinion 124 which is engaged with the overrunning clutch 122 is to rationally driven together with the rotation output shaft 117.

The force of plunger 128, urged as described, rotates the lever 126 anticlockwise with the rotation shaft 126*a* as the center of rotation, causing overrunning clutch 122 to slide forward along an axial line with the pinion 124. Thereby, the pinion 124 engages with, for example, a ring-gear circumferentially provided on a flywheel mounted on a crank shaft of an engine (not shown), to start the engine.

With the conventional engine starter as hereabove described, the electromagnetic switch and the dc motor are parallel-axially composed. Therefore, when the conventional engine starter is mounted on a vehicle, a space for the electromagnetic switch is needed on the vehicle side, exclusive of the engine or the engine section, thus imposing a restriction on the engine layout in the vehicle and causing other problems.

In order to avert such a problem it was proposed to provide a starter unit in a simple form as a mere oblong cylinder, with the electromagnetic switch arranged on one axial end side of the dc motor. According to this proposal, the basic composition is such that the plunger rod of the electromagnetic switch unit or a similar push rod is extended to the rotation output shaft through the internal passage of the armature rotation shaft. Such a starter unit is called a coaxial type starter unit, because the armature rotation shaft of the dc motor and the rod of the electromagnetic switch unit are arranged on a common axial line.

However, when the coaxial type is adopted as hereabove proposed, its overall shape would become a simple oblong cylinder, but this has involved the problem of its total length becoming too long.

In a coaxial type starter, with the electromagnetic switch disposed at the rear of the motor, it is necessary that the armature rotation shaft should be hollowed and the rod of the magnetic switch inserted into the shaft to push the rotation output shaft. In a case however, there is a fear that dust or oil may enter through the armature rotation shaft or brush powders; and thus there is the problem that complete sealing of the contact chamber of the electromagnetic switch is impractical.

Therefore, the conventional coaxial type starter is formed so as to have its contacts installed in separate places thereby resulting in a lengthened dimension of the starter.

In the above-described coaxial type starter, a coil spring for restoring the aforementioned rotation output shaft to its former position after the engine has started is necessary, and there is the problem that depending on where this coil spring is installed the total length of the starter becomes too long, and the additional problem that the composition of the stopper for restricting the forward movement of the aforementioned rotation output shaft becomes complex.

Further, to avoid interference of the end edge part of the front bracket with, for example, the flywheel inside the engine mission housing, the configuration of the flywheel is restricted.

DC motors employed in vehicle starter units and the like also are structured as shown in FIG. 2. Such a conventioned dc motor is equipped with an armature core 101 mounted on a rotation shaft 102, and a commutator 103 is supported on this rotation shaft on one side of armature core 101. This commutator 103 is a so-called face type, having a contacting surface 103*a*, with brushes 105*a* of the brush unit 105 formed as a perpendicular surface normal to the axial line of the rotation shaft 1. The commutator 103 comprises a large number of commutator segments 103*b* insulated from each other with a synthetic resin. To each of these segments 103*b*, a terminal part 104*a* of each armature coil is drawn out of the armature core 101 and connected. Accordingly, these terminal parts 104*a* are closely arranged around the rotation shaft 102 in its circumferential direction, thereby forming a ringed terminal wire group 104.

On the outer circumference of this ringed terminal wire group 104, a fastening ring 200 which is called a "bid" is provided for preventing outward projection of said terminal wire group 104 due to centrifugal force when it is turned together with the armature core 101 and the commutator 103. This bind 200 is generally formed by winding piano wire 200*a* on the upper surface of an insulating paper 201. In place of the piano wire 200*a*, a ringed iron plate or a tape impregnated with a resin, or the like, may be used.

In FIG. 2, 105*b* designates a holder for the brush unit 105, and 202 is a mold part for supporting the commutator 103 on the rotation shaft 102 through an insert 203.

Generally, when a dc motor is utilized as a vehicle starter, the revolution of the rotation shaft is transmitted to an overrunning clutch through a reduction gear. In a starter of this construction, sometimes the armature core is reduced in size by increasing the reduction ratio of the reduction gear for miniaturization and reduction in weight of the dc motor. In this case also, the commutator size is physically determined, so that it cannot be reduced in size in correspondence with the armature core. Accordingly, the commutator becomes relatively larger than the armature core, and when the armature core is reduced in size, its revolution will be at a higher speed, hence a very large centrifugal force is imposed on the commutator.

In other applications not limited to vehicle starters the commutator segments are made larger than the armature core for improving a current-rectifying function. When the commutator is made large, brush sweep error is increased and the current density is reduced whereby the rectifying condition is improved and the brush service life is prolonged. In such a state also, the commutator will receive a larger force from the centrifugal force, since the commutator becomes relatively larger than the armature core.

Further, in every case described hereabove, when the commutator is of the so-called face type in which its contacting surface with brushes is formed perpendicular to the axial line of the rotation shaft, the size of the commutator directly manifests itself as an expansion of the dimension in the radial direction, resulting in an increase of the force it experiences. However, when a sufficiently large force due to centrifugal acceleration is exerted on the commutator, connection of the commutator segments by an insulator therebetween may be broken, presenting a problem of their bursting out.

SUMMARY OF THE DISCLOSURE

Accordingly, it is an object of this invention, to solve such conventional problems, to provide a small engine starter by retrenching its whole length as much as possible.

It is another object to provide a starter wherein contacts are not soiled by the powdered brush debris from the motor part or by the dust infiltrating through the hollow shaft of the armature.

It is another further object to provide a coaxial type starter which not permits simplification of its structure, even at providing a coil spring for restoring the pinion backward or a stopper for restricting its forward movement, and can also achieve a coaxial and compact design as well.

Furthermore, it is still another object to provide a dc motor which can deter its commutator segments from bursting out even under a large force experienced by the commutator due to centrifugal acceleration during use.

This invention involves an engine starter comprising a motor having a tubular armature rotation shaft and a rotation output shaft disposed on one end side of the motor. On the armature rotation shaft and supported slidably in its axial direction, is provided a clutch mechanism for transmitting torque from the armature rotation shaft to the rotation output shaft. An electromagnetic switch is installed on the other end side of the aforementioned motor with regard to axial direction, has a shifting member actuated by an electromagnetic force to cause the rotation output shaft to push and slide in its axial direction. The aforementioned electromagnetic force also brings a movable contact in touch with a fixed contact, thereby supplying power to the aforementioned motor, with the rear part of the aforementioned rotation output shaft and the front part of the aforementioned shifting member inserted into the tube of the aforementioned armature rotation shaft from mutually opposite directions. This invention is intended to provide a compact engine starter of the coaxial type, by adopting a form effective for preventing ingress of dust, especially between the motor and the electromagnetic switch.

Restricting the disposing position of the spring providing a restoring force to return the rotation output shaft to a rest position after the starter has started the engine allows for a more compact design.

Furthermore, compactness of the structure for holding the brushes for supplying power to the motor is also obtained.

For structural reinforcement in the process of more compact designing, attention has been paid particularly to the fitting part of the commutator and the armature coils of a dc motor used in an engine starter. Thus, for the purpose of integrally mounting the armature coil terminal parts and the commutator on the rotation shaft, a bind is fitted to the outside of the armature coil terminal parts at a boss-shaped part of the commutator, straddling thereover, so that a highly reliable dc motor may be obtained.

BEST MODE FOR CARRYING OUT THE INVENTION

The present invention will become more apparent from the description provided hereunder in conjunction with the accompanying drawings.

Figure 1:
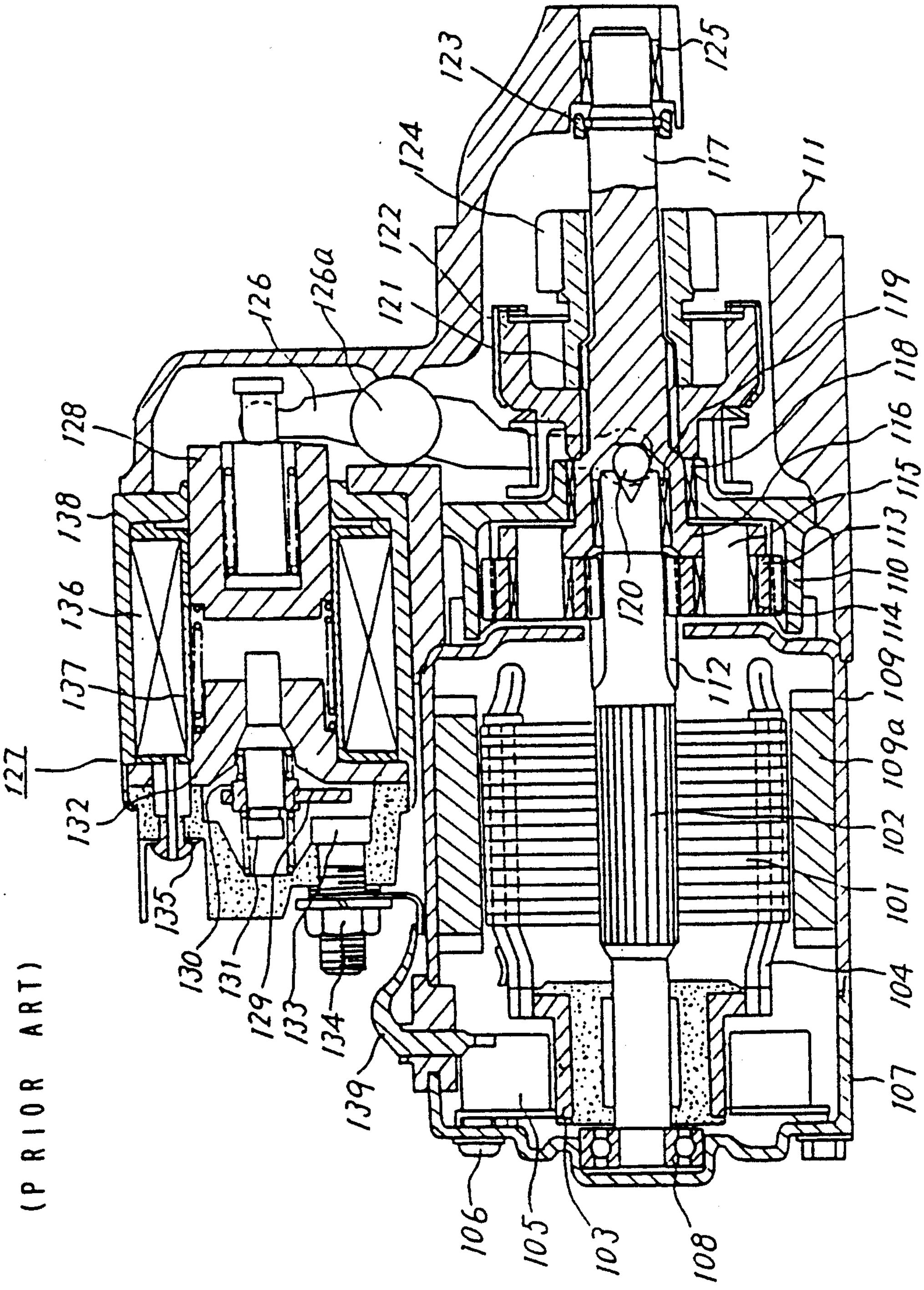
FIG. 1 (PRIOR ART)
FIG. 1 is a sectional view of the conventional engine starter.
Figure 2:
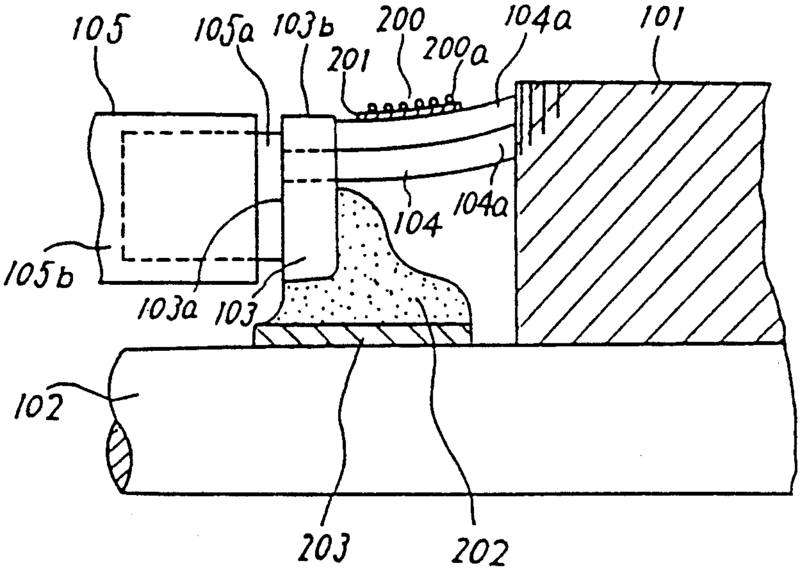
FIG. 2 (PRIOR ART)
FIG. 2 is a sectional view partially showing the conventional dc motor.
Figure 3:
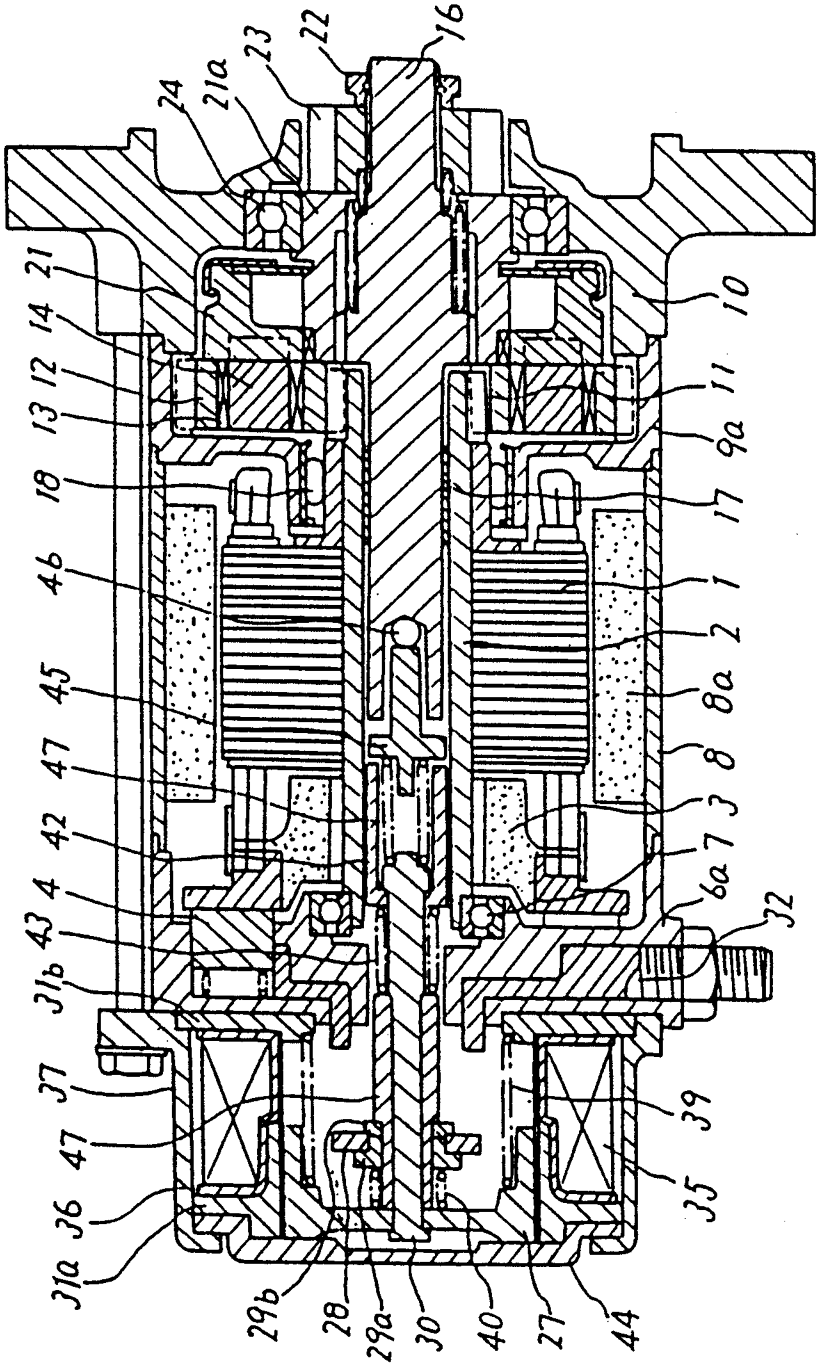
FIG. 3 is a sectional view of an engine starter in accordance with a preferred embodiment of this invention.

FIG. 3 is a sectional structural view of a coaxial type starter in accordance with a preferred embodiment of this invention, comprising an armature 1 of a dc motor, an armature rotation shaft 2, and a face type commutator 3 engagingly set to the rear of armature 1. 6a designates a bracket, preferably molded of an insulator resin, wherein brushes 4 are inserted. Bearing 7 supports the armature rotation shaft 6 and engagingly fits with resin bracket 6a. A fixed contact 32 is integrally molded with the resin bracket 6a.

Movable contact 28 is mounted on a bushing 41 through insulators 29a and 29b. Spring 40 provides a bias force for pressing the movable contact 28, and its reaction is received by a plunger 27 which fixes the rod 30. The bushing 41 is placed outside the rod 30, receives by an end face the reaction of the spring 43 which presses a sleeve 42 which pushes the rotation output shaft 16 forward, and is formed with a minute clearance between it and the internal circumferential surface of resin bracket 6a. An exciting coil 35 is provided for urging the plunger 27 which is wound on a bobbin 36 made of resin. Iron cores 31a and 31b, together with a casing 37 and the plunger 27, form a magnetic path. Nonmagnetic plate 44 is securely held between the case 37 and the iron core 31a. A spring 39 is provided for restoring the plunger 27 and is preferably made of stainless steel and is inserted between the plunger 27 and the iron core 31b. A second rod 45 is aligned with the rotation output shaft 16 through a steel ball 46, and a spring 47 thrusts the steel ball toward the rotation output shaft 2. Permanent magnet 8a is for producing a magnetic field, and 8 is a yoke of the dc motor, on an end surface whereof there is outfitted a bracket 9a which supports an internal gear with which the planetary reduction gear train is engaged.

At the front end part of the armature rotation shaft 2, a spur gear 11 is formed and planetary gear 12 is engaged therewith. Bearing 13 is engagingly set in the internal circumferential surface of a planetary gear which is supported by a supporting pin 14, and this supporting pin 14 is securely set on the rear of an overrunning clutch 21. A bearing 24 is engagingly set in an overrunning clutch inner tube 21a to support radial loads, and is engagingly fit in a cavity of the front bracket 10. A rotation output shaft 16 is provided in front and at the rear is slidably engaged by splining with a helical spline formed on the inner surface of the overrunning clutch inner tube 21a. Sleeve bearing 17 supports the rear end of the rotation output shaft 16 and is engagingly set on the inner surface of the armature rotation shaft 2. Bearing 18 supports the front end part of the armature rotation shaft 2, and is engagingly set in the cavity of the bracket 9a provided with an internal gear, as shown in FIG. 3.

Pinion 23 is engagingly fit with a straight spline formed on the outer circumference of the front end of the rotation output shaft 16. Stopper 22 maintains the pinion 23 on the rotation output shaft 16.

Figure 4:
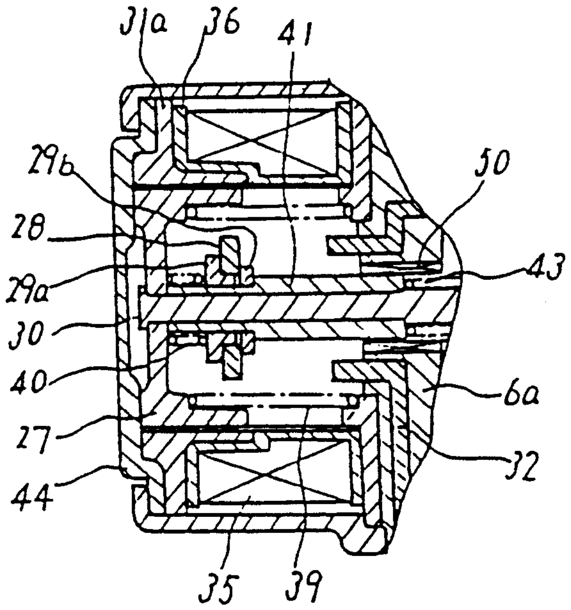
FIGS. 4–11 are diagrams for showing various component parts of an engine starter in accordance with the preferred embodiment of this invention.

FIG. 4 shows an embodiment having a sleeve bearing 50 engagingly set on the inside surface of the resin bracket 6a.

Figure 5:
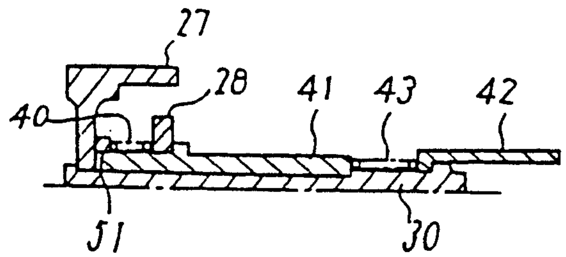

FIG. 5 shows an embodiment wherein the bushing 41 is manufactured of a resin, and shows the movable contact 28 and the spring 40 installed with an insulating plate 51 placed between the aforementioned bushing 41 and the plunger.

The operation of the starter will now be described. By closing a key switch (not shown in FIG. 4), the exciting coil 35 is electrified, whereby the plunger 27 is actuated and the movable contact 28 begins to move forward. Forward-moving force of the rod 30 is transmitted to the rotation output shaft via the sleeve 42, the second rod 45 and the steel ball 46. After contacting of an end surface of the pinion 23 with an end surface of the ring gear (not shown) the rod 30 further moves forward and the spring 43 is compressed. At the same time, the movable contact 28 contacts the fixed contact 32 to energize the motor via the brushes 4, thereby to start the motor. By the force of compressed spring 43, the pinion 23 is pushed and begins to engage with a ring gear. Since the bushing 41 is always constituted so that there exists a minute clearance between itself and the resin rear bracket 6a, it becomes possible to prevent infiltration of any powdered debris from the brush or the commutator surface and any dust from the hollow of the armature, to prevent the contact from getting soiled thereby.

As described, according to this invention the coaxial type starter is equipped with a mechanism for pressing the rotation output shaft having the pinion by the rod of the electromagnetic switch and a mechanism for transferring a movable contact. Therefore it is possible to prevent soiling of the contacts by any debris from the commutator surface and by the dust coming through the armature rotating hollow shaft, hence a small-size, coaxial type starter is provided.

While the above embodiment describes a means for preventing problems resulting from contamination due to dust, another embodiment, also for preventing invasion of dust, will be described hereunder.

In this embodiment, an oil seal is provided by fitting on the internal circumferential surface of each brush holder provided with a fixed contact of an electromagnetic switch or on the internal circumferential surface of the rear bracket, and the rod of the electromagnetic switch is slidably arranged on the oil seal.

Figure 6:
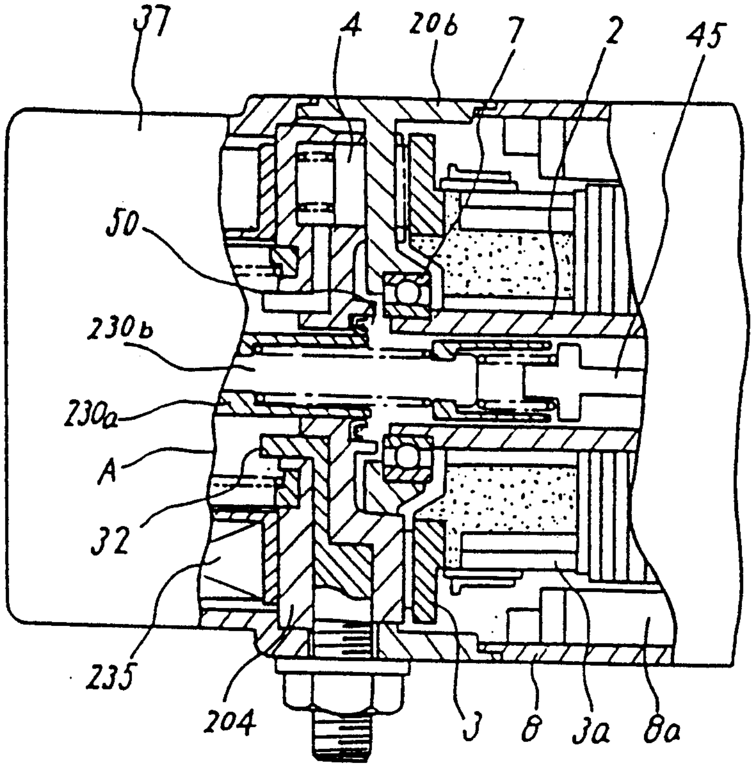

This embodiment will not be described in conjunction with FIG. 6. In this figure, no particular definition is given to parts which have already been mentioned with reference to FIG. 3.

FIG. 6 is a partial sectional view of an engine starter according to a second embodiment of this invention. In this figure, the oil seal 50 fits on the internal circumferential surfaces of the brush holder 204, which hermetically closes the electromagnetic switch's contact chamber A by making sliding contact with the plunger rod 230a.

Thus, when a key switch (not shown) is turned "on", an exciting coil 235 of the electromagnetic switch is electrified. As a result, the plunger is urged to move forward together with the rod 230*b*. Thereby, the outer circumferential surface of the plunger rod 230*a* mounted on the rod 230*b* is brought into a sliding contact with the oil seal 50, causing the movable contact to be in touch with the fixed contact 32. Accordingly, the brushes 4 connected to the fixed contact 32 by lead wires are electrified so that the armature coils 3*a* are electrified through a commutator 3, to cause the armature to turn.

Figure 7:
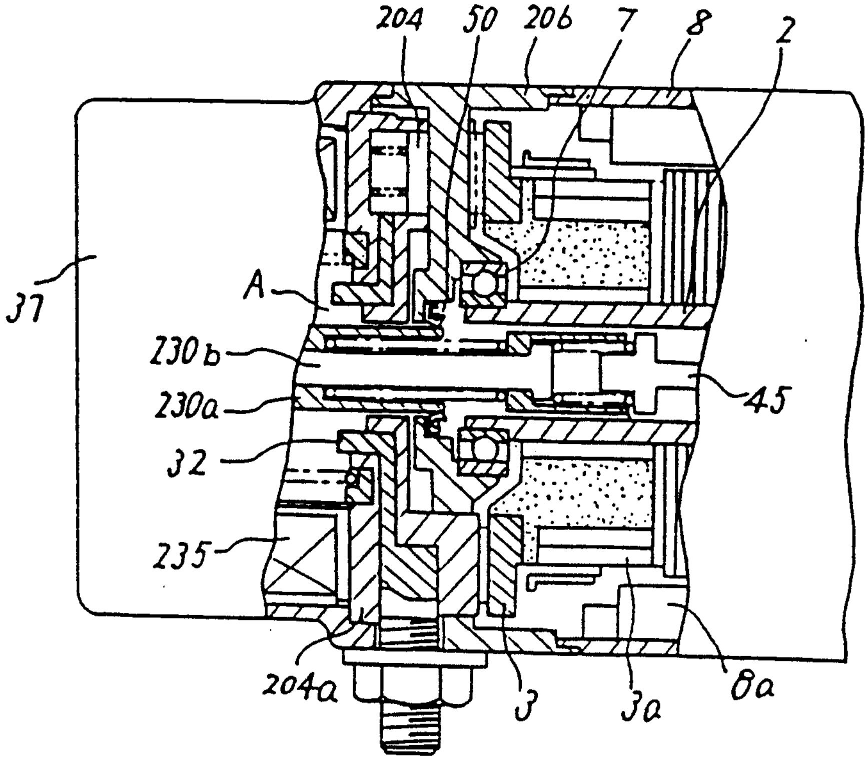

While in the aforementioned embodiment the oil seal 50 is mounted on the brush holder 204, as shown in FIG. 7, the oil seal 50 may be engagingly located on the inner circumferential surface of the rear bracket 206 made of a conductive member or a resin, whereon a bearing 7 disposed between a yoke 8 and the electromagnetic switch to support the rear end of the armature rotation shaft 2 is mounted. The plunger rod 230*a* may be brought into a sliding contact with this oil seal 50. In this way, the contact chamber A of the electromagnetic switch can be hermetically closed similarly as in FIG. 6.

Figure 8:
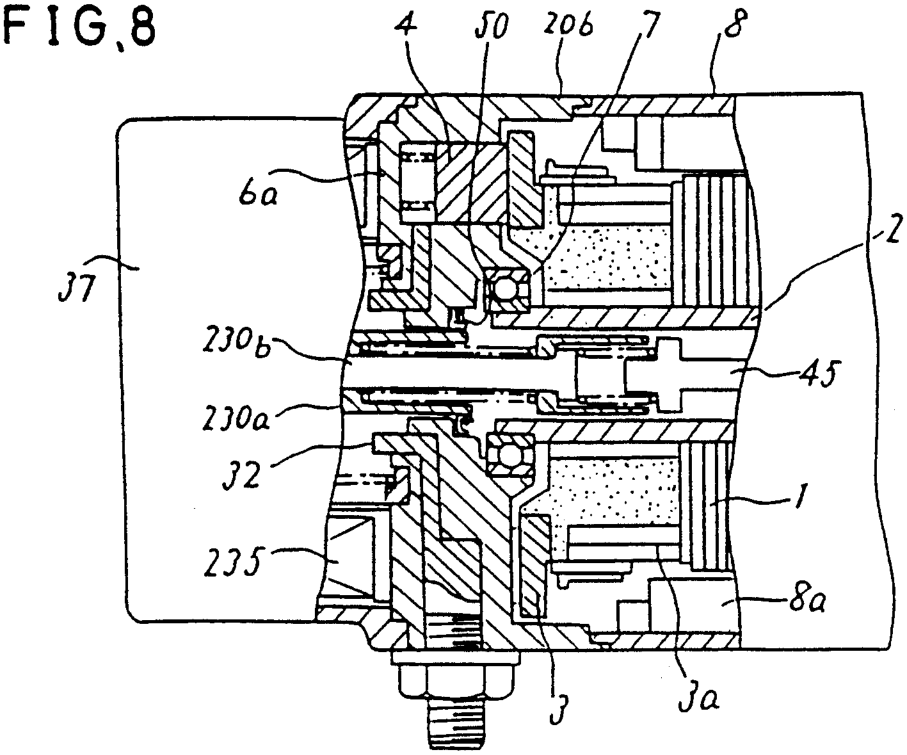

Besides, as shown in FIG. 8, as the rear bracket of which the oil seal 50 is mounted, if the rear bracket 204 and the brush holder 204 are integrally formed of a resin the number of parts will be reduced, yielding the benefit of reduced cost in manufacture.

According to the embodiments shown in FIGS. 6–8, the oil seal is provided on the inner circumferential surfaces of the brush holders provided with the electromagnetic switch fixed contact or on the inner circumferential surface of rear bracket on which the bearing for supporting the armature rotation shaft is mounted. On these oil seals, the electromagnetic switch rod is brought into sliding contact, and the electromagnetic switch contact chamber is thereby hermetically sealed to avert invasion into the contact chamber of dust or oil or abraded brush powders or debris, enabling realization of a coaxial type starter which is of high quality, small size and reduced weight.

In the following, a structure for restoring the rotation output shaft to its former position after engine starting is described.

The helical spline placed on the inner circumferential surface of the overrunning clutch inner tube is provided with its forward end part abutting. Between the front end stepped part provided on the overrunning clutch inner tube and the stepped part of the rotation output shaft, which engagingly fits in splined engagement with the helical spline, a coil spring is installed so as to be positioned inside the helical spline.

With this structure, the front abutting end part of the helical spline restricts the forward movement of the rotation output shaft by the restoring force of the coil spring. The rotation output shaft is moved backward to its former position.

Figure 9:
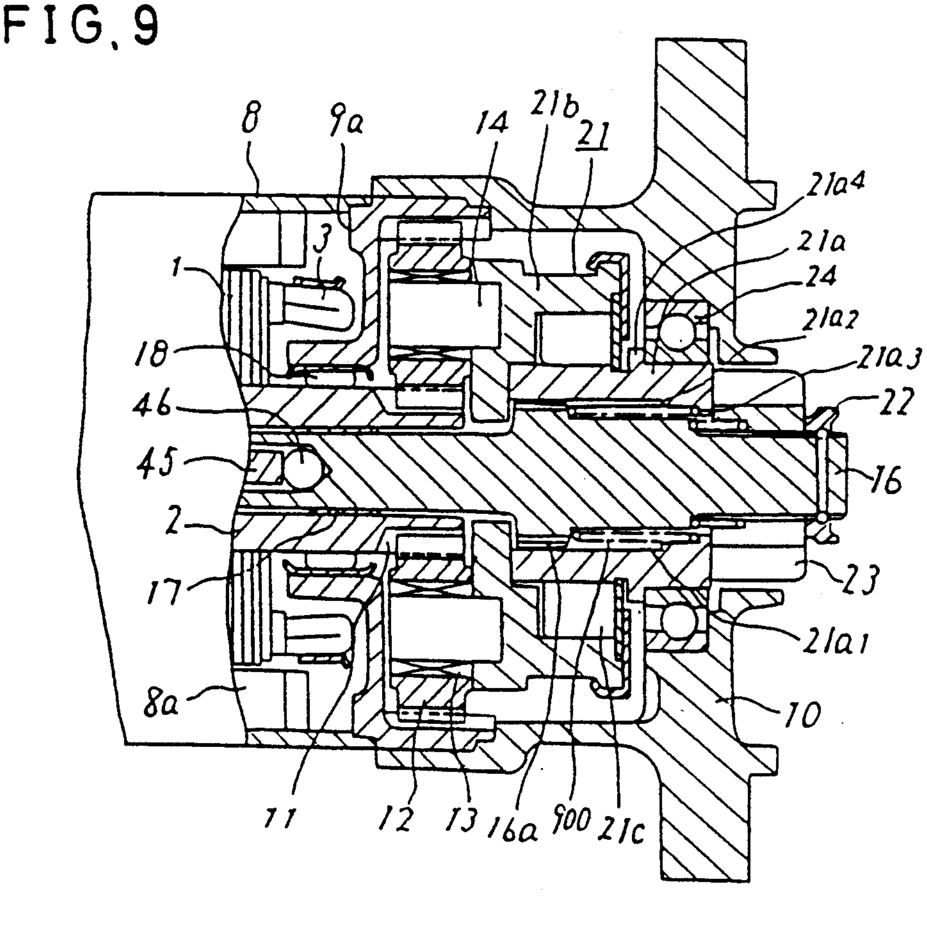

The elements related to this embodiment are shown in FIG. 9. 21*a* designates the overrunning clutch inner tube, 21*b* an overrunning clutch outer tube, and 21*c* a roller arranged between them, the overrunning clutch 21 comprising the aforementioned elements 21*a*–21*c*. 21*a*$_1$ designates a helical spline formed by cold forging on the inner circumferential surface of the overrunning clutch inner tube 21*a*. It is engagingly fit in splined manner with the rotation output shaft 16 in front. Sliding of the rotation shaft 16, and with its forward abutting end part 21*a*$_2$ provided, causes the forward movement of the rotation output shaft 16 to be restricted. Inside the aforementioned helical spline 21*a*$_1$, and between the stepped part 21*a*$_3$ at the front end of the overrunning clutch inner tube 21*a* formed inward thereof and the stepped part 16*a* of the output rotation shaft 16, there is installed a coil spring 900 for returning the rotation output shaft 16 backward. Bearing 24 is provided for supporting radial load, and is engagingly set to be abutted at its rear part on the stepped part 21*a*$_4$ formed on the outer circumference of the clutch inner 21*a* and is engagingly fit in the cavity of the front bracket 10.

In the following, the operation of this embodiment of the starter is described. When the armature coils 3 are electrified and the armature 1 produces turning force, the rotation of the armature 1 is translated into revolution of the planetary gear 12 through a spur gear 11. This is reduced in speed by this planetary reduction mechanism and is transmitted to the overrunning clutch 21 to be transmitted to the rotation output shaft 16 which is engagingly fit in splined manner with the helical spline 21*a*$_1$ provided on the overrunning clutch inner tube 21*a*.

On the other hand, the force of the plunger of the electromagnetic switch urged by the energization is transmitted to the rotation output shaft 16 through the rod 45 and the steel ball 46 placed inside the hollow shaft of the armature rotation shaft 2. The rotation output shaft 16, which has received the forward thrusting force, moves ahead until it abuts on the forward abutting end part 21*a*$_2$ of a helical spline 21*a*$_1$ created on the overrunning clutch inner tube 21*a*, compressing the coil spring 900 installed inside the helical spline 21*a*$_1$ provided on the inner circumferential surface of the overrunning clutch inner tube 21*a*. Thereby, the pinion 23 engagingly fit with the rotation output shaft 16 moves forward to engage with a ring gear that is not shown in this figure. Engaging with the ring gear will enable starting of the engine.

When the aforementioned key-switch is opened, deenergization of the electromagnetic switch causes backward movement of the plunger of the electromagnetic switch, and the recovering force of the coil spring 900 pushes the rational shaft 16 backwardly to restore it to its former position as shown in the FIG. 9.

As hereabove described, according to this embodiment a helical spline is provided on the inner circumferential surface of the clutch inner tube and coil spring is placed inside the helical spline between the inner stepped part and the rotation output shaft stepped part; therefore, it is effective in enabling a unit to be formed simply and at low cost and amenable to miniaturization and reduction in weight.

In the following, the structure of the bracket and the brush holder are described:

In an engine starter per this embodiment of the invention, supporting holes are provided in the bracket which support the bearing of the hollow armature rotation shaft. The brush holder for holding the brushes which abut on the commutator is engagingly set in the aforementioned holding holes, and the electromagnetic switch is disposed at the rear part of the brush holder.

This embodiment is particularly described below in conjunction with FIG. 10.

Figure 10:
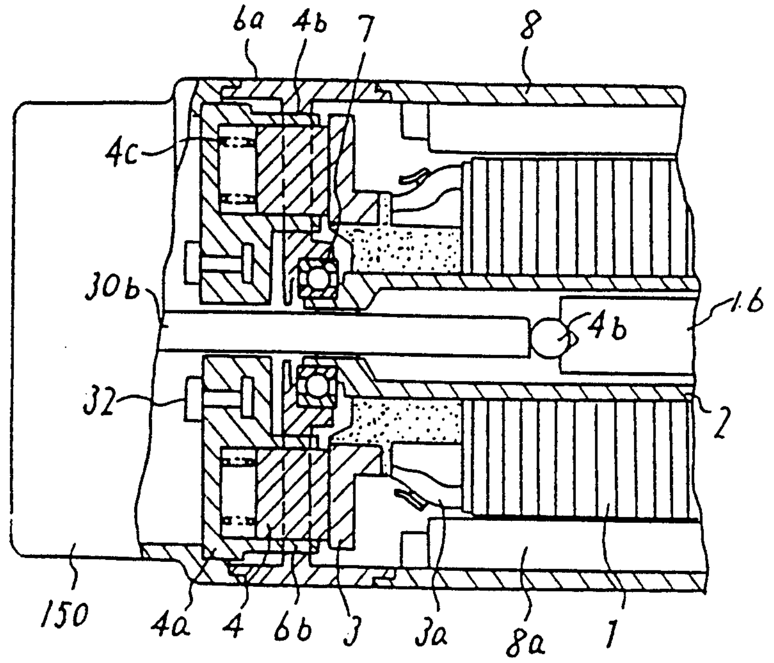
Figure 11:
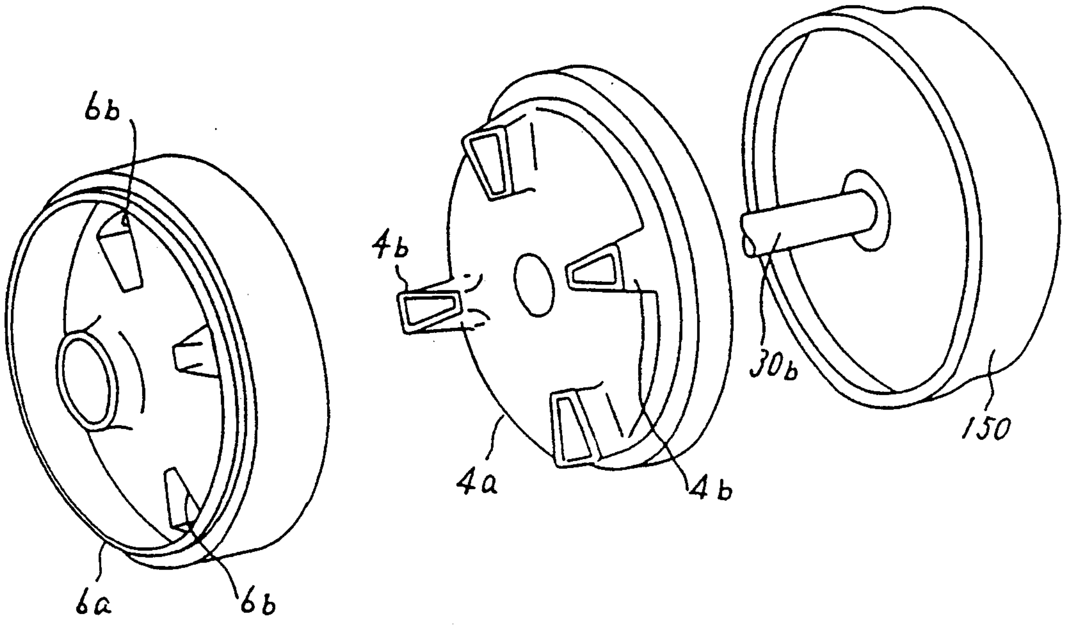

FIG. 10 is a sectional view of the essential parts of the bracket and the brush holder, and in this figure, a brush 4 is inserted in the brush housing 4*b* of a brush holder 4*a* made of a resin, with a spring 4*c* thereon. A rear bracket 6*a* in a bottom part has a plurality of supporting holes 6*b*, bored as shown in FIG. 11, to permit insertion of the brush holder 4*a*; from the rear of this rear bracket 6*a* the brush housings 4*b* of the brush holder 4*a* are inserted. Bearing 7 supports the armature rotation shaft 2, which is supported by the rear bracket 6*a*. Fixed contacts 32 are fitted on the bottom of the brush holder 4*a*, and an electromagnetic switch 150 which effects pressing of the rod 30*b* of the plunger to the rotation output shaft 16 through a ball 46 is disposed at a rear position of the rear bracket 6*a*.

This structure permits brush housings of the brush holders to be inserted into the supporting holes of the rear bracket and, then, the electromagnetic switch arranged at a rear position of the brush holders. A coaxial disposition of the electromagnetic switch and the motor and a lightweight compact structure is achievable.

In the following, the fastening structure of the armature coil terminal parts of a dc motor is described.

In the engine starter according to this embodiment of this invention, the armature coil terminal parts and segments (commutator segments) are fixed by fastening with a ring shape bind straddling thereover.

Furthermore, a commutator having an outside diameter larger than the diameter of the armature core is used with a bind fitted to be straddling over the boss-shaped parts of the commutator and the aforementioned terminal parts, the bind having an internal diameter larger than the diameter of the armature core is used.

Figure 12:
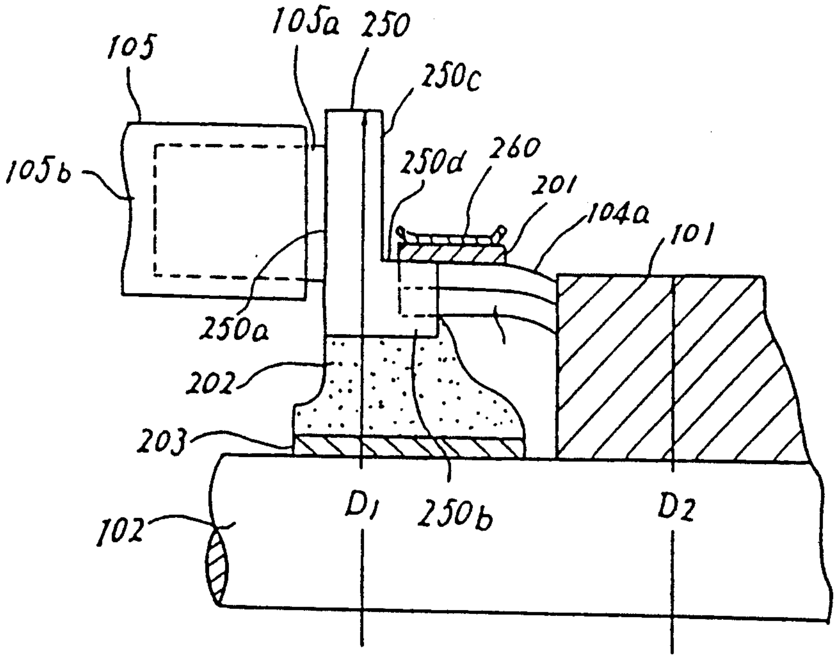
FIG. 12 is a sectional view partially showing a dc motor in accordance with an embodiment of this invention.

The fastening structure of the armature coil terminal parts is described hereunder in conjunction with FIG. 12, which shows the fastening structure of the aforementioned armature coil terminal parts. The motor shown in FIG. 12 is provided with a face type commutator 250, wherein its diameter $D_1$ is made larger than the diameter $D_2$ of the armature core 101. In this commutator 250, a boss shape part 250*b* extending to the side of armature core 101 along the axial direction is formed at its part in contact with the mold part 201 which supports it, with its outside diameter made nearly equal to or larger than the diameter of the armature core 101. This commutator 250 is composed of L shape segments 250*c* arranged at equal intervals in a circumferential direction, with interposing spaces between the segments filled with a resin for mutual insulation among the segments.

To each segment 250*c* in such a commutator 250, the terminal part 104*a* of the armature coil is connected through the boss-shaped part 250*b* of commutator 250. For this reason the outside diameter of the ringed terminal wire group 104 composed of a large number of terminal parts 104*a* becomes equal to or larger than the diameter $D_2$ of the armature core 101. Then a bind 260 is fitted to be straddling over both the boss-shaped part 250*b* of the commutator 250 and the terminal wire group 104 of terminal parts 104*a*. This bind 260 comprises a ring-shaped iron sheet and is fitted by insertion from the side of armature core 101 onto an insulating paper 201 having a width sufficient to straddle over the boss-shaped parts 250*b* of the commutator 250 and the terminal wire group 104 after the insulation paper 201 has been wound thereon. Since the boss-shaped parts 250*b* and the terminal wire group 104 have diameters nearly equal to or larger than that of the armature core, the internal diameter of the bind 260 outfitted thereover is, of course, nearly equal to or larger than the diameter of the armature core 101. Therefore, the bind can conveniently be introduced from the armature core 101 side by passing over said core 101. Then the bind 260 clamps the respective segments 250*c* of the commutator 250 and the terminal parts 104*a* radially inward.

The most preferable example of the bind 260 is the ring-shaped iron sheet as has been shown. It may, in the alternative, be formed by windings of piano wire or a tape impregnated with a resin instead of the iron sheet.

With such a structure, even when the commutator 250 experiences a large centrifugal acceleration as it rotates at a high speed or when a large centrifugal force is experienced with increased diameter of the commutator 250 disintegration due to the centrifugal forces on all the segments 250*c* of the commutator 250 is prevented since they are pressed down by the bind 260 at their boss shape part 250*b*.

Since the side surface of the commutator is formed with a boss-shaped part with an outside diameter nearly equal or larger than the diameter of the armature core and since the terminal parts of the armature coils are connected to respective segments through this boss-shaped part, a bind having an internal diameter larger than the diameter of the armature core can be employed. As a result, even if the bind is formed of a ringed plate member, it may be fitted conveniently by inserting it from the armature core side. Accordingly, the bind attaching operation is greatly improved and the bind will not be broken apart by the centrifugal force.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A dc motor, comprising:

an armature core mounted on a rotation shaft;

a commutator mounted on said rotation shaft adjacent said armature, said commutator comprising a plurality of segments linked to respective terminal parts of armature coils drawn out of said armature core;

a brush unit, disposed to contact said segments; and a bind, arranged in a ring shape straddling over terminal parts of said armature coils and said segments, wherein said commutator has a contacting surface for making contact with brushes of said brush unit, said contacting surface being formed as a vertical surface crossing normal to said rotation shaft and having an outside diameter larger than a diameter of said armature core, a boss-shaped part being formed on a side part of said commutator at said armature core side, with an outside diameter equal to or larger than the diameter of said armature core, said bind being formed of a ringed plate member with an internal diameter larger than the diameter of said armature core and disposed to be straddling over said boss-shaped part, and a ringed terminal wire group being formed of said terminal parts connected to said segments.

2. A dc motor according to claim 1, wherein:

said bind comprises a ringed plate made of iron.

3. A dc motor according to claim 1, wherein:

said commutator is of a face type, having a contacting surface thereof with brushes of said brush unit formed as a vertical surface crossing normal to an axial line of said rotation shaft.

4. A dc motor according to claim 1, wherein:

said bind comprises a ringed member formed by winding a plurality of turns of piano wire.

5. A dc motor according to claim 1, wherein:

said bind comprises a ringed member formed of a tape impregnated with a resin.

* * * * *